United States Patent [19]

Daugaard

[11] Patent Number: 5,691,079
[45] Date of Patent: Nov. 25, 1997

[54] BATTERY FORMED OF STACKED FLAT CELLS

[75] Inventor: Jørgen Daugaard, Højbjerg, Denmark

[73] Assignee: Alkaline Batteries A/S, Thisted, Germany

[21] Appl. No.: 765,060

[22] PCT Filed: Jul. 7, 1995

[86] PCT No.: PCT/DK95/00295

§ 371 Date: Jan. 6, 1997

§ 102(e) Date: Jan. 6, 1997

[87] PCT Pub. No.: WO96/02072

PCT Pub. Date: Jan. 25, 1996

[30] Foreign Application Priority Data

Jul. 8, 1994 [DK] Denmark ................. 0820/94

[51] Int. Cl.⁶ ................ H01M 6/46; H01M 6/00
[52] U.S. Cl. ................ 429/152; 429/4; 429/162; 29/623.2
[58] Field of Search ................ 429/149–155, 429/162, 4; 29/623.1, 623.2

[56] References Cited

U.S. PATENT DOCUMENTS

| | | | |
|---|---|---|---|
| 2,658,936 | 11/1953 | Rock | 429/153 |
| 2,677,716 | 5/1954 | MacFarland . | |
| 2,774,806 | 12/1956 | Jobe et al. | 429/155 |
| 2,820,081 | 1/1958 | Daley et al. | 429/155 X |
| 2,889,389 | 6/1959 | Tamminen . | |
| 3,907,599 | 9/1975 | Fanciullo et al. | 429/152 |
| 4,203,202 | 5/1980 | Esaian et al. | 429/155 |

FOREIGN PATENT DOCUMENTS

| | | |
|---|---|---|
| 2945996 | 6/1980 | Germany . |
| 2661/81 | 7/1982 | Germany . |

*Primary Examiner*—Anthony Skapars
*Attorney, Agent, or Firm*—Cushman Darby & Cushman Intellectual Property Group of Pillsbury Madison & Sutro LLP

[57] ABSTRACT

The invention relates to a battery formed of stacked flat cells comprising an anode and a cathode, e.g. comprising a zinc anode, an alkaline electrolyte and a manganese dioxide carbon cathode, the casings of said cells being formed of upwardly open plastic trays (10) stacked to form a unit, the upwardly facing edge (11a, 11b) of a subjacent tray in the stack being sealingly connected with a circumferential edge portion (12a, 12b) of the bottom of the superjacent tray along the entire periphery, the upper edges (11a) of the trays (10) and the circumferential edge portions (11b) thereof coacting with complementary guiding and joining faces (12a, 12b) in the bottom of the superjacent tray. The circumferential edge portion (12a) in the bottom and/or the upper edge (11a) of the tray 10 is provided with fluid permeable means to facilitate intrusion of the solvent by capillary effect at fusion of the trays. As a result, an improved intrusion of solvent is obtained, which ensures an improved fusion of the trays than hitherto known, and consequently a completely tight battery.

10 Claims, 2 Drawing Sheets

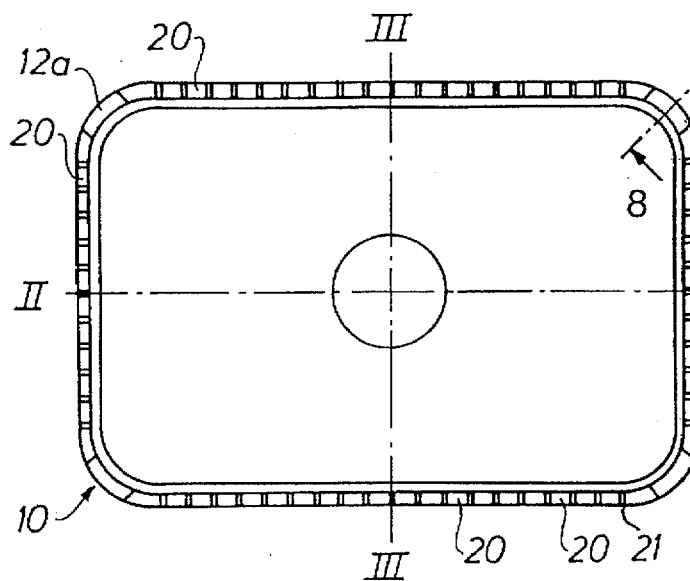
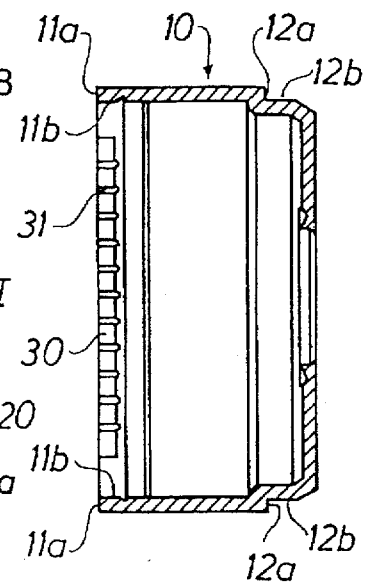
Fig. 1
Fig. 3
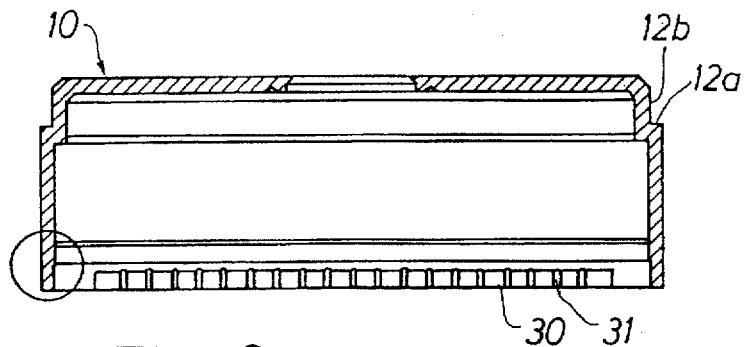
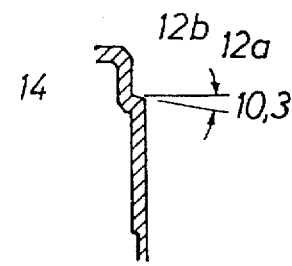
Fig. 2
Fig. 8
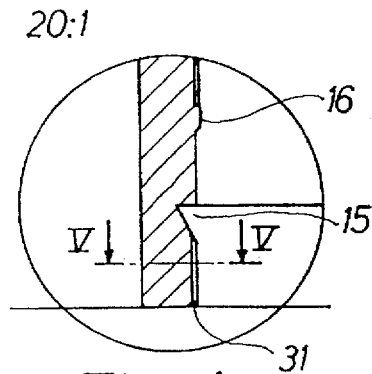
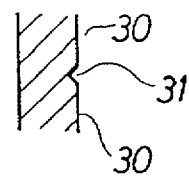
Fig. 4
Fig. 5

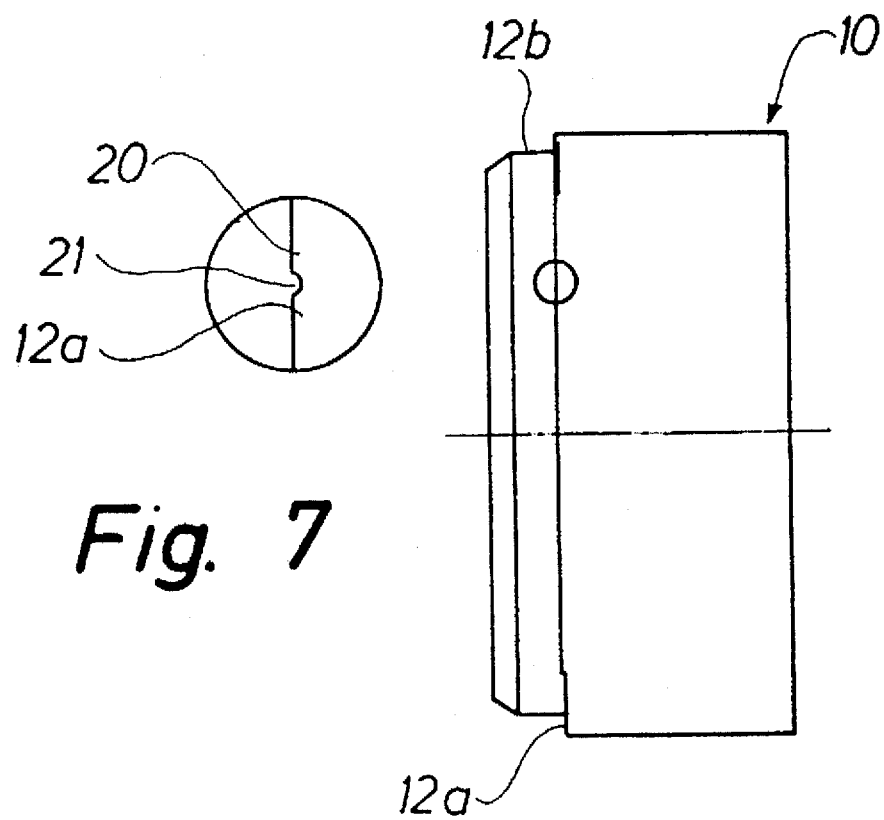
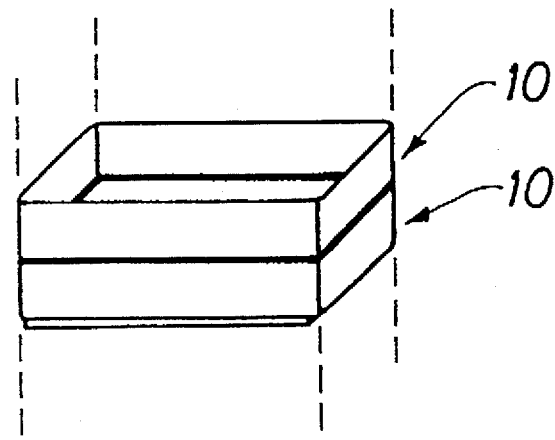

5,691,079

BATTERY FORMED OF STACKED FLAT CELLS

This application is the national phase of international application PCT/DK95/00295 filed Jul. 7, 1995 which designated the U.S.

TECHNICAL FIELD

The invention relates to a battery formed of stacked flat cells comprising an electro-chemical battery system having an anode and a cathode, the casings of said cells being formed of upwardly open plastic trays stacked to form a unit, the upwardly facing edge of a subjacent tray in the stack being sealingly connected with a circumferential edge portion of the bottom of the superjacent tray along the entire periphery, the upper edges of the trays and the circumferential edge portions of the bottom having essentially complementary guiding and joining faces.

BACKGROUND ART

Plastic cells may be fused together by immersing cells pressed against each other in a solvent, such alcohol, confer e.g. German patent No. 900.958.

Danish patent application No. 2661/81, further, discloses a battery of the above type having complementary guiding and joining faces and provided with a plurality of circumferential cavities adapted to stop any leaking of electrolyte fluid.

It is, however, difficult to obtain an effective fusion of the cells, as these typically only are fused in the outermost surface, the fused layer thus being fairly thin and sensitive to wearing during the assembly process and to formation of pressure in the stack of cells usually containing an alkaline electrolyte. It is extremely important that the stack remains tight, as the alkaline electrolyte possesses a considerable leakage ability. The alkaline electrolyte is an aggressive medium which will damage the equipment, in which the battery is mounted, if the battery leaks.

BRIEF DESCRIPTION OF THE INVENTION

According to the invention, a battery of the above type is characterised in that the circumferential edge portion in the bottom of the tray and/or the upper edge of the tray is provided with fluid permeable means (such as a rough surface, ridges, grooves or the like roughness suitable to form a small gap between the joining faces) to facilitate intrusion of the solvent by capillary effect at joining of the trays. Accordingly, improved solvent intrusion is obtained as well as increased contact area available for joining two trays than if the surfaces had been smooth. As a result, an increased minimum wall thickness of the fused stack is obtained and thus a product being ensured against leaking of electrolyte fluid is obtained.

Preferably, in order to enhance the intrusion of solvent by capillary effect at fusion of the trays, the vertical inner faces of the tray are provided with fluid permeable means in a band along the upper edge of the faces and/or along the vertical outer faces of the circumferential edge portion in the guiding faces of the bottom. The fluid permeable means are preferably formed as ridges, grooves or channels defined by ridges, preferably in such a manner that narrow grooves or channels, having a width of approximately 0.2 mm and a depth of approximately 0.06 mm, are formed between the ridges.

The grooves or ridges on the vertical faces are preferably arranged opposite the corresponding ridges or grooves on the horizontal portion of the circumferential bottom edge portion of the tray and/or on the horizontal portion of the upper edge of the tray.

It is preferable that the fluid permeable means coact with one or more essentially circumferential cavities acting as interference for the capillary effect and thus forming a barrier for the solvent intruding from the outside as well as for the electrolyte fluid in the interior of the tray.

Moreover, the invention relates to a method as defused in claim 10 for joining the trays to form a completely sealed stack.

BRIEF DESCRIPTION OF THE DRAWINGS

The invention is explained in details in the following based on a preferred embodiment and with reference to the drawings, in which FIG. 1 illustrates a stackable flat cell in a bottom view, FIG. 2 is a vertical sectional view through the above embodiment along the line II—II in FIG. 1, FIG. 3 is a vertical sectional view through the above embodiment along the line III—III in FIG. 1, FIG. 4 shows a detail of FIG. 2, FIG. 5 is a sectional view along the line V—V in FIG. 4, seen in the direction of the arrow, FIG. 6 is a side view of the flat cell in FIG. 1, FIG. 7 shows a detail of FIG. 6, and FIG. 8 is a sectional view through the wall of the flat cell as defined by the broken line and the arrows A—A.

FIG. 9 shows a stack of trays. For the sake of simplification, only two trays are shown.

BEST MODE FOR CARRYING OUT THE INVENTION

The stackable flat cell shown in FIG. 1, which may contain a zinc anode, an alkaline electrolyte and a manganese dioxide cathode, is provided with a casing formed of an upwardly open plastic tray 10. The plastic trays 10 are preferably made of a plastic type permeable for hydrogen without being permeable for oxygen, nitrogen or carbon dioxide. The plastic trays may be stacked to form a unit, as shown in FIG. 9, the upwardly facing edge of a subjacent tray 10 being connected with a circumferential edge portion 12 of the bottom of the superjacent tray 10 along the entire periphery, the upper edge of the trays and the circumferential edge portions 12 of the bottom being essentially complementary—confer FIG. 1.

According to the invention, in the circumferential edge portion 12 in the bottom of the tray (and/or optionally in the upper edge of each tray) ridges or grooves are formed providing gaps, preferably small gaps of capillary dimensions, facilitating a intrusion of the solvent.

In a preferred embodiment, a total of sixty ridges 20 are separated by narrow gaps 21 having a width of approximately 0.2 mm and a depth of approximately 0.06 mm, as shown in FIG. 5 and 7, providing well-defused gaps between two stacked trays ensuring that a solvent intrudes between the surfaces denoted by the reference numerals 11a and 12a.

Preferably, said ridges 20 in the bottom edge 12a coact with corresponding vertical ridges 30 arranged in a band 11b adjoining the upper edge 11a of the tray, (said ridges 30 comprising twenty ridges on each long side and ten on each of the short sides), on the four inner faces 11b of each tray 10, allowing the solvent to continue the intrusion further down along the inner face of the tray in the thus formed gaps 31 between the inner face 11a of a tray 10 and the outer face 12b of the bottom of the superjacent tray.

As a result, the adhesive area is larger than in known battery trays, as it comprises the horizontal upper edge 11a of the tray bound to the horizontal, circumferential edge 12a around the bottom of the superjacent tray, and further of the essentially circumferential band 11b on the inner face of the upper edge of the tray bound to the essentially circumferential band 12b on the outer face of the bottom of the superjacent tray.

Preferably, the edge surface 12a forms an angle relative to the horizontal upper edge surface or vice versa, whereby a wedge-shaped gap 14 is provided, the uppermost edge 11a of a tray only abutting the circumferential edge 12a of the bottom of a superjacent tray at the bottom of the wedge-shaped gap as shown at the reference numeral 14a. This gap helps to ensure that the solvent may intrude between the trays, where it partially dissolves, the surfaces 11a, 11b and 12a, 12b of the walls of the tray, said faces thus being fused together as the solvent evaporates. The wedge-shaped gap 14 preferably forms an angle in the order of 10° and most preferably 10.3°. Without the new ridges or grooves according to the invention, the fusion described would tend to only take place in the joining area 14a between the faces 11a and 12a, and the resulting stack would be more fragile and more liable to leak.

An essentially circumferential groove 15 on the inner face of tray is shown in FIGS. 2, 3 and 4, FIG. 4 being an enlarged sectional view. The groove 15 and the circumferential bottom guiding face of the superjacent cell form an essentially circumferential cavity of a preferably triangular cross section. A cavity of this type acts as an interference for a capillary effect, whereby e.g. the further intrusion of the solvent is stopped. Clearly, it is not desirable that the solvent reaches the interior of the tray, since the tray together with an anode, a cathode, in particular a zinc anode, an alkaline electrolyte and a manganese dioxide cathode shall form a cell in a battery. Further, one or more cavities of the above type may be adapted to act as an absorbing cavity for any leaking electrolyte fluid during the fusion process per se, i.e. while the loosely stacked cells, which are not fused together, are submerged in the solvent and subsequently withdrawn a number of times. During this process, it is essential to avoid that the electrolyte fluid leaks as it will tend to adhere to the surfaces to be fused, thereby deteriorating the fusion.

Preferably, on the inner face of the lateral walls of the tray, an essentially circumferential ridge 16 is provided abutting the inclined, bevelled edge of the bottom, when the trays are stacked, thereby providing sealing of the electrolyte cell.

In an alternative embodiment, the vertical channels or grooves and optionally the cavities may be provided in the bottom circumferential guiding face 12b.

When a battery is formed by stacking the desired number of flat cells, the fusion is subsequently made by immersing one or more stacks of flat cells one or several times in a vessel containing a solvent, for instance "THF" i.e. tetrahydrofuran, during which the solvent intrudes the wedge-shaped gap 14 and due to the ridges or grooves 21, 31 further into and preferably so deeply that an essentially circumferential band on the inner faces 11b and the guiding faces 12b are covered by solvent. Typically, the stacks of flat cells are immersed a few periods of time, each lasting from two to eight seconds. During such an immersion, it is advantageous to subject the vessel containing the solvents and the immersed stacks of flat cells to ultrasound, either for part of the immersion period or for the entire immersion period. As a result, a tight and durable fusion between the individual flat cells is obtained. By using ultrasound, it is ensured to a greater extent that the solvent intrudes in the manner described and thus provides tight and strong fusions.

It is obvious that the above invention may be varied in many ways. The ridges or roughness may be provided for the opposite, complementary faces, the edge 11a and the guiding face 12b, and it is within the scope of the invention to use the described cells with other electrochemical battery systems, such as NiCd.

I claim:

1. A battery formed of stacked flat cells comprising an electrochemical battery system having an anode and a cathode, the casings of said cells being formed of upwardly open plastic trays (10) stacked to form a unit, the upwardly facing edge (11a) of a subjacent tray (10) in the stack being sealingly connected with a circumferential edge portion (12a) of the bottom of the superjacent tray along the entire periphery, the upper edges (11a, 11b) of the trays (10) and the circumferential edge portions (12a, 12b) thereof in the bottom having essentially complementary guiding and joining faces (11a, 12a, 11b, 12b), characterised in that the circumferential edge portion (12a) in the bottom of the tray and/or the upper edge (11a) of the tray (10) is provided with fluid permeable means to facilitate intrusion of the solvent by capillary effect at fusion of the trays.

2. A battery as claimed in claim 1, characterised in that fluid permeable means are provided at the vertical inner faces (11b) of the tray in a band along the upper edge (11a) and/or at the vertical outer faces (12b) of the circumferential edge portion in the guiding faces of the bottom to facilitate intrusion of the solvent by capillary effect at fusion of the trays.

3. A battery as claimed in claim 1, characterised in that the fluid permeable means are formed as grooves, ridges or channels defused by ridges, preferably narrow ridges of a width of approximately 0.2 mm and a depth of approximately 0.06 mm.

4. A battery as claimed in claim 3, characterised in that the vertical grooves or channels on the inner faces (11b, 12b) are arranged opposite and connected with the grooves, ridges or channels on the circumferential edge portion (12a) in the bottom and/or on the upper edge (11a) of the tray (10).

5. A battery as claimed in claim 1, characterised in that the fluid permeable means are provided by a roughness in the surfaces.

6. A battery as claimed in one or more of the preceding claims, characterised in that the upwardly facing edge (11a) of a tray (10) and the corresponding edge (12a) of the bottom of a superjacent tray (10) form a wedge-shaped gap (14).

7. A battery as claimed in one or more of the preceding claims, characterised in that the fluid permeable means co-act with one or several essentially circumferential cavities (15) provided in the inner faces of (11b) of the tray (10) and/or the outer faces (12b) of the bottom of the tray (10).

8. A battery as claimed in one or more of the preceding claims, characterised in that a circumferential ridge (16) is provided on the inner face (11b) of the tray and adapted to coact with the circumferential edge of the bottom of the tray.

9. A battery as claimed in claim 6, characterised in that the wedge-shaped gap (14) forms an angle in the order of 10°.

10. A method of assembling a battery formed of stacked flat cells comprising an anode and a cathode, in particularly comprising a zinc anode, an alkaline electrolyte and a manganese dioxide carbon cathode, the casings of said cells being formed of upwardly open plastic trays (10) stacked to form a unit, the upwardly facing edge (11a, 11b) of a subjacent tray in the stack being sealingly connected with a circumferential edge portion (12a, 12b) of the bottom of the superjacent tray along the entire periphery, the upper edges of the trays (10) and the circumferential edge portions (12) thereof coacting with complementary guiding and joining faces in the bottom of the superjacent tray, by which method a stack of flat cells is immersed in a vessel containing solvent, characterised in that the vessel containing the solvent and the submerged stacks of flat cells are subjected to ultrasound for a part of the immersion period and preferably for the entire immersion period.

* * * * *

UNITED STATES PATENT AND TRADEMARK OFFICE
CERTIFICATE OF CORRECTION

PATENT NO. : 5,691,079
DATED : November 25, 1997
INVENTOR(S) : Jørgen DAUGAARD

It is certified that error appears in the above-identified patent and that said Letters Patent is hereby corrected as shown below:

TITLE PAGE:

Please change "[73] Assignee: Alkaline Batteries A/S, Thisted, Germany" to
--[73] Assignee: Alkaline Batteries A/S, Thisted, Denmark--.

Signed and Sealed this

Twenty-fourth Day of November, 1998

*Attest:*

BRUCE LEHMAN

*Attesting Officer*  *Commissioner of Patents and Trademarks*